July 7, 1964
J. P. THOMAS ETAL
3,140,106
LIP SEAL CASE FITTING
Filed July 5, 1960
2 Sheets-Sheet 1
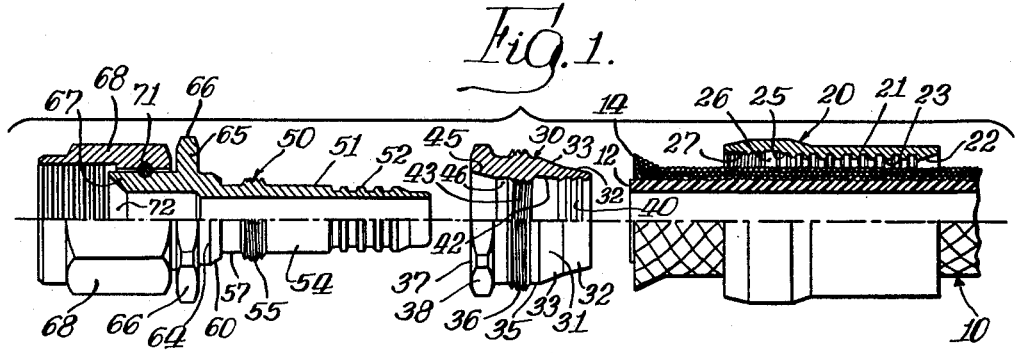
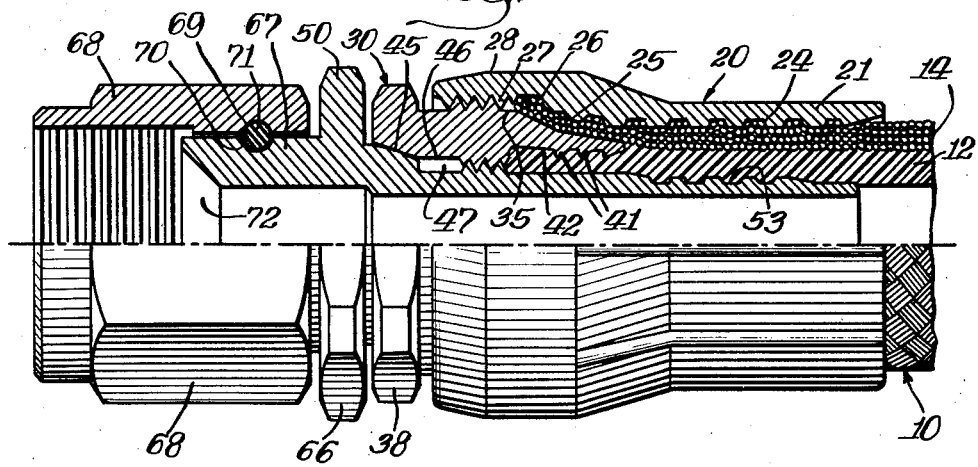
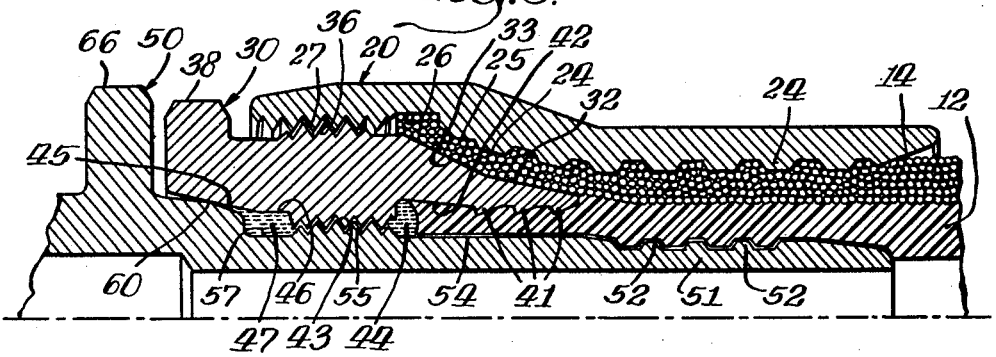
INVENTORS.
John P. Thomas,
Horise M. Cooke,
BY
Davis, Lindsey, Hibben & Noyes
Attys.

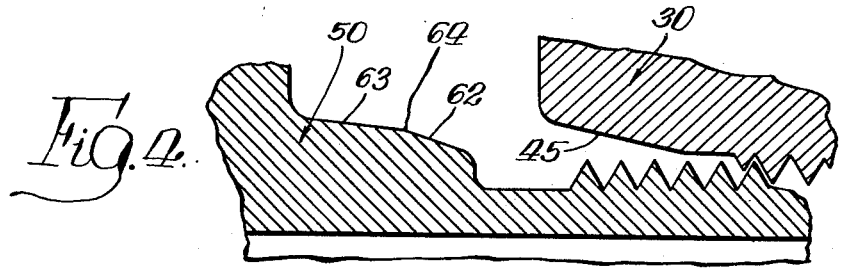
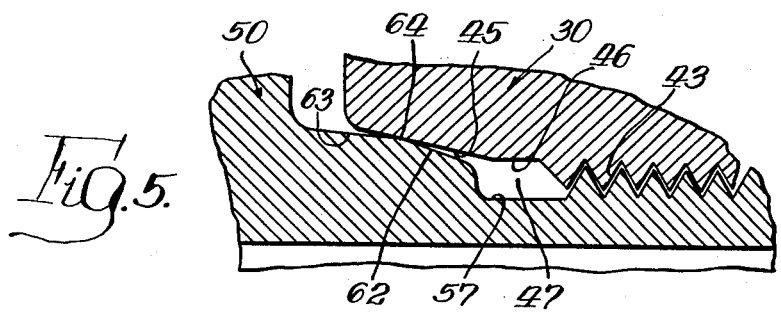
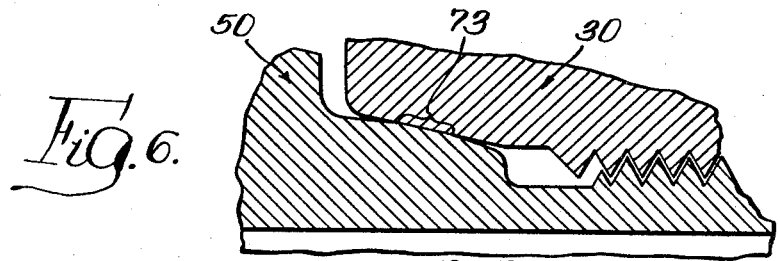
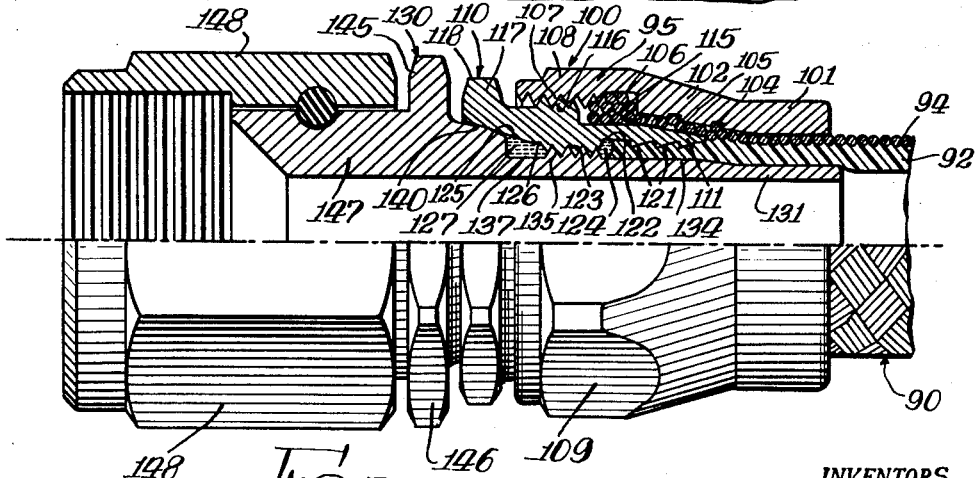

United States Patent Office 3,140,106
Patented July 7, 1964

3,140,106
LIP SEAL CASE FITTING
John P. Thomas and Horise M. Cooke, Fort Worth, Tex., assignors to Stratoflex, Inc., Fort Worth, Tex., a corporation of Texas
Filed July 5, 1960, Ser. No. 40,647
1 Claim. (Cl. 285—149)

The present invention relates generally to an end fitting for a flexible hose and particularly to a fitting for a hose 10 of the type having an elastomer inner tube for retaining fluid, and an outer flexible wire braid reinforcing structure for supporting the inner tube against the internal pressure of the fluid.

The general object of the present invention is to provide a novel end fitting providing improved retention of the hose which results in a substantially blowoff-proof assembly.

It is also an object of the invention to provide an end fitting which has improved structure for entrapping and gripping the elastomer inner tube of the hose.

It is a further object of the invention to provide an end fitting which has unique structure for gripping the reinforcing wire braid of the hose.

It is also an object of the present invention to provide a fitting having an improved metal-to-metal seal between parts of the fitting.

Other objects of the invention will be apparent from the following description taken in connection with the attached drawings in which:

FIGURE 1 is an exploded longitudinal sectional view, partially in elevation, of a fitting embodying the present invention ready for assembly;

FIG. 2 is a longitudinal sectional view, partially in elevation and on an enlarged scale, of a fitting of FIG. 1 in fully assembled position on a length of hose;

FIG. 3 is a fragmentary longitudinal sectional view of the fitting, on a still larger scale, after fluid pressure is applied within the hose;

FIGS. 4, 5 and 6 are fragmentary longitudinal sectional views of parts of the fitting, showing steps in bringing the parts together into sealing relation.

FIG. 7 is a longitudinal sectional view, partially in elevation, of a modified form of fitting mounted on a length of hose.

Referring to FIGS. 1 to 3 of the drawing, the numeral 10 designates a length of flexible hose which comprises an inner tube 12 of an elastomeric substance, such as polytetrafluroethylene, known in the trade as "Teflon," which is very durable but more difficult to grip than rubber, for retaining fluid, and an outer flexible reinforcement, such as a wire winding or wire braid 14, for supporting the inner tube 12 against the pressure of fluid therein.

An end fitting for high pressure use and embodying the present invention is adapted to be mounted on the end of the hose 10 and comprises generally a tubular socket 20 adapted to fit over the end of the hose 10, an insert member 30 which is adapted to be inserted into the end of the hose 10 between the inner tube 12 and the wire braid 14, and a nipple member 50 having one end adapted to fit into the end of the hose 10 within the inner tube 12 with the other end provided with means for detachably engaging another tubular connection member (not shown).

The socket 20 has at one end thereof an elongated generally cylindrical section 21 with an axial bore 22 of a diameter which is adapted to fit about said hose 10 and to freely receive the hose therein. The cylindrical section 21 is adapted to be crimped about the hose and extends a substantial distance axially of said hose, and the bore 22 is provided with inner peripheral gripping means 23 having an irregular surface preferably comprising spaced annular ribs 24, or threads, with angular sides, firmly grip the outer peripheral surfaces of the wire braid 14.

The inner end of the bore 22 merges into a generally frustro-conical section with an inner gripping portion 25 which flares outwardly and has a gradually enlarging taper corresponding to the normal flare of the braid 14 at the end of the hose 10 resulting from the hose-cutting operation, whereby the wire braid pattern is not distorted when the gripping portion 25 engages the hose 10. Internal ribs or threads are also provided in the portion 25. An enlarged annular groove 26 is formed beyond the gripping portion 25 on the inner peripheral surface of the socket 20, which is adapted to receive the forward end of the wire braid. Beyond the groove 26 and extending to the open end of the socket 20 an internally threaded section 27 is provided, which is adapted to threadably engage the insert member 30. The exterior surface 28 of the socket 20 is round and preferably has no polygonal portion which could be engaged by a wrench, or the like, thus avoiding having the socket backed off and loosening the gripping engagement on the wire braid.

The insert member 30, which is tubular and is adapted to be disposed within the end of the hose 10 between the inner tube 12 and the wire braid 14, has a generally frustro-conical tapered end section 31 formed on the outer peripheral surface thereof. More particularly, the tapered end section 31, which serves as a gripping surface, is formed by first and second frustro-conical portions 32 and 33, respectively. The first portion 32 is disposed at the end of said insert and the second portion 33 extends axially therefrom and lies at a greater angle to the axis of the insert member than said first portion 32. The first frustro-conical portion 32 is adapted to extend axially a substantial distance and into the crimped portion of the socket 20. The first frustro-conical portion 32 and the second frustro-conical portion 33 are both adapted to cooperate in radially spaced relationship with the inner peripheral gripping surface 25 of the socket 20 when the insert 30 is threadably engaged in the socket 20 to securely hold the wire braid 14. Further cooperation of the portions 32 and 33 with the gripping surface 25 takes place when the socket 20 is crimped or otherwsie reduced in diameter. Extending from the end of the frustro-conical surface 33 is an outer peripheral cylindrical section 35 with a threaded section 36 forwardly thereof for engagement with the threads 27 of the socket 20. Beyond the threaded section 36, the insert has an end section 37 provided with a relatively narrow polygonal outer surface 38 adapted to receive a wrench, or the like, to facilitate threading the insert 30 into the socket 20.

The axial bore of the insert 30 is provided generally opposite the first frusto-conical surface 32 with an inner peripheral gripping portion 40 having formed thereon a plurality of angular serrations or ribs 41 which provide radially extending abutment surfaces facing the end of the tube 12. Inwardly beyond the innermost rib 41 is a generally annular groove 42 formed on the inner peripheral surface of the insert, tapering to provide a slightly greater depth at the inner end of the groove than at the end adjacent the ribs 41. The annular groove 42 is adapted to receive the end portion of the inner tube 12. An interior threaded section 43 is located beyond the groove 42 and is adapted to be threaded on the nipple 50. Beyond the threaded section 43 of the insert 30, the inner peripheral surface thereof is provided with an axially extending and outwardly tapering surface 45. A short unthreaded cylindrical section 46 is preferably disposed between the threaded section 43 and the tapered surface 45.

The nipple member 50, which is adapted to fit into the end of both the hose 12 and the insert member 30 and form a sealing engagement with the insert 30, is provided at one end thereof with a generally cylindrical elongated portion 51 preferably having on part of its length a series of serrations or spaced annular ribs 52 on the outer peripheral surface thereof. The ribs 52 are located beyond the end of the insert 30 when the fitting is assembled, and provide an irregular gripping surface 53 which cooperates in spaced relation with the irregular inner peripheral surface of the wire braid to grip the tube 12 and restrain the tube against axial movement, said braid being held against axial movement by the ribbed gripping surface 23 of said socket.

On the outer peripheral surface of the nipple 50 beyond the gripping surface 53, the portion 51 is of slightly enlarged diameter providing a cylindrical section 54 which cooperates in radially spaced relation with the ribs 41 and the annular groove 42 of the insert 30 to provide a sealing chamber 44 whereby an improved gripping and sealing engagement with the tube 12 is effected. An exterior threaded section 55 on the nipple 50 extends axially from the cylindrically surface 54 and is adapted to threadably engage the threaded section 43 of the insert 30. An annular groove 57 beyond the threaded section 55 cooperates in radially spaced relation with the cylindrical section 46 of the insert 30 to form an elongated chamber 47 providing adequate clearance between the threaded section 43 of the insert 30 and a sealing section on the nipple 50 when the insert and nipple are brought into sealing engagement.

The nipple member 50 has a generally enlarged diameter section 60 formed on the outer peripheral surface thereof beyond the groove 57 to provide a circumferential sealing engagement with the outwardly tapered surface 45 of the insert member 30. The section 60 extends from the edge of the groove 57 and is preferably formed by first and second tapering frusto-conical portions 62 and 63, respectively, which intersect along a circumferential line 64, said portions 62, 63 both tapering away from the tapered surface 43 of the insert 30 on both sides of the circumferential line 64 (see FIG. 5).

Beyond the portions 62 and 63, the nipple 50 has an enlarged section 65 provided with flats 66 on the outer surface thereof, which provide engaging surfaces for a wrench or other tool adapted to threadably seat the nipple 50 in the insert 30. A cylindrical connector section 67 extends axially from the section 65 and is provided with connecting means. In the present instance, such connecting means is shown as comprising a conventional swivel nut 68 fitting over the section 67 and having an annular groove 69 which cooperates with a mating groove 70 in the connecting section 67 to provide an annular recess into which a locking wire 71 may be seated in the usual manner. The interior of the section 67 may also be provided with a standard 37° seat section 72.

In assembling the foregoing connector structure, the socket 20 is positioned over the hose rearwardly of the end of the hose 10. The insert member 30 is then inserted into the end of the hose 10 with the tapered end section 31 fitting between the wire braid 14 and the outer surface of the tube 12. The socket 20 is then moved forwardly up to the insert member 30 and the threaded section 36 thereof is brought into threaded engagement with the threaded section 27 of the socket. When the insert 30 is seated in the socket 20, the wire braid 14 is forced into the annular groove 26 and into the serrations or ribs formed on the inner gripping portion 25 of the socket 20 and is gripped therein by the compression between the double tapered surface 31 of the insert 30 and the gripping portion 25 of the socket 20 without, however, causing distortion of the pattern of the braid 14. The wire braid 14 is thus firmly gripped between the socket 20 and the insert 30 before inserting the nipple member 50, so that insertion of the nipple 50 cannot move the hose longitudinally relative to the socket.

The nipple member 50 is next inserted into the end of the tube 12 and in so doing, the tube 12 is expanded slightly, causing the tube to be packed between the ribs 52 of the outer surface of the nipple member. Also, the enlarged diameter cylindrical section 54 of the nipple forces the tube 12 into the groove 42 and ribs 41 formed on the inner surface of the insert member 30, thus substantially filling the seal chamber 44.

When the threaded section 55 of the nipple member 50 is brought into threaded engagement with the correspondingly threaded section 43 of the insert member 30, the circumferential line 64 along the intersection of the tapered portions 62 and 63 of the nipple member 50 initially forms a metal-to-metal circumferential line seal, as shown in FIG. 5, with the tapered surface 45 of the insert member 30, as there is only a single point of contact in any axial plane. As additional torque is applied to the nipple member 50 and the nipple member is advanced into the insert member 30, the contacting surfaces of the members force any particles of dust or other foreign matter out of the sealing area and burnishes the surfaces to prevent gauling which commonly occurs in most mating angle seals heretofore designed. When fully engaged, the nipple member 50 and the insert member 30 form a sealing zone in the form of a flattened circumferential sealing band 73, as shown in FIG. 6, which forms a positive sealing engagement between the insert member 30 and the nipple member 50 under any pressure conditions encountered to thereby prevent fluid being forced outwardly past the sealing band 73.

After the nipple member 50 is in place, the socket 20 is crimped to clamp the tube 12 tightly between the ribbed outer gripping surface 53 of the nipple 50 and the irregular inner gripping surface provided by the wire braid 14, as shown in FIG. 2.

As shown in FIGS. 2 and 3, the polygonal outer surface 38 of the insert member 30 has a smaller maximum diameter than both the adjacent end surface 28 of the socket 20 and the flats 66 of the nipple 50. The surface 38 also has a relatively small axial length so that the adjacent surfaces of the socket 20 and the nipple 50 are spaced axially when the fitting is fully assembled a distance less than the width of a standard wrench means. Before the nipple 50 is assembled with the other parts, the insert member 30 can be threadedly seated in the socket 20 by engaging the polygonal outer surface 38 with a standard wrench means or the like. After the nipple 50 is threadably seated in the insert member 30, however, the polygonal surface 38 is no longer accessible to a standard wrench means and only a specially designed wrench means can be inserted between the surface 28 and the flats 66 to grip the surface 38. Thus, with the surface 38 being both relatively narrow and spaced transversely inwardly of the adjacent surface 28 and the flats 66, it is impossible for the fitting to be disassembled or tampered with by the ordinary mechanic who does not have the special wrench means required.

When used in a high-pressure fluid system, the hose and fitting of FIGS. 1–6 provides a pressure-activated seal on the end section of the tube 12 enclosed between the insert member 30 and the nipple member 50. As high-fluid pressure is applied to the hose, the seal is activated when fluid passes longitudinally between the inner peripheral surface of the tube 12 and the outer peripheral surface of the nipple member 50. The fluid flowing longitudinally is prevented from leaking to the exterior of the fitting by the metal-to-metal band seal 73 between the insert 20 and the nipple 50. Fluid pressure is thereby built up in the chamber 47 and in the forward end of the sealing chamber 44. Such pressure will move the end of the tube 12 axially, as shown in FIG. 3, thereby forcing the end of the tube into an area of smaller cross-sectional dimension because of the tapering of the groove 42 and thus into tight sealing engagement with both the insert member 30 and the nipple member 50. In this manner a positive seal is formed which holds the fluid pressure being applied to the assembly. The positive gripping of the tube by the gripping surface 53 on the nipple and wire 14 holds the main body of the tube against endwise movement to insure the positive seal.

In the modified form of hose fitting shown in FIG. 7, a length of flexible hose 90, comprising an inner tube 92, such as rubber, "Teflon" or other generally similar material, and an outer wire braid 94 or other reinforcing wire surrounding the inner tube 92, is provided with an end fitting 95 which is adapted for use where only moderate or medium fluid pressure is to be used within the hose 90. The end fitting 95 comprises a tubular socket 100 fitted over the end of the hose 90, an insert member 110 which is inserted into the end of the hose 90 between the inner tube 92 and the wire 94, and a nipple member 130 having one end which fits into the end of the hose 90 within the inner tube 92 with the other end provided with means for detachably engaging another tubular connection member (not shown).

The socket 100 has at one end thereof a generally cylindrical section 101 having a diameter which may or may not fit tightly about the said hose 90. The cylindrical section 101 merges into a generally frusto-conical section 102 with an inner peripheral gripping surface 105 which flares outwardly and has a gradually enlarging taper corresponding to the normal flare of the braid 94 provided at the end of the hose 90 by the hose cutting operation, whereby the wire braid pattern is not distorted when the gripping surface 105 engages the hose 90. One or more grooves 104 may be provided in the surface 105 to assist in gripping the braid. An enlarged annular groove 106 is formed at the end of the gripping section 105 on the inner peripheral surface of the socket 100, which is adapted to receive the forward end of the wire braid 94. The enlarged diameter open end of the socket 100 is provided with an inner peripheral threaded section 107 adapted to threadably engage the insert member 110. The exterior surface 108 of the socket 100 preferably is provided with flats 109 which can be engaged by a wrench, or the like.

The insert member 110, which is adapted to be disposed within the end of the hose 90 between the inner tube 92 and the wire braid 94, has a generally frusto-conical tapered section 111 formed on the outer peripheral surface thereof. The frusto-conical section 111 is adapted to cooperate in radially spaced relation with the inner peripheral gripping surface 105 of the socket 100 to securely hold the wire 94. Extending from the larger end of the frusto-conical section 111 is an outer peripheral cylindrical section 115 which with the groove 106 in the socket 100 forms a chamber to receive the end portion of the wire braid. Beyond the section 115 is a threaded section 116 engageable with the threaded section 107 of the socket, and an enlarged end section 117 provided with an outer angular surface 118 adapted to receive a wrench, or the like, to facilitate seating the insert 110 in the socket 100.

The axial bore of the insert 110 is provided, in the area generally opposite the frusto-conical section 111, with an inner peripheral gripping portion having formed thereon a plurality of angular serrations or ribs 121 which provide radially extending inwardly facing abutment surfaces. Extending inwardly from the innermost rib 121 is a generally annular groove 122 formed on the inner surface thereof and tapering to provide a slightly greater depth at the inner end than at the end adjacent the ribs 121. The annular groove 122 is adapted to receive the end portion of the inner tube 92. An interior threaded section 123 extends forwardly from the groove 122 and is adapted to threadably engage the nipple 130. At the end of the insert 110 and beyond the threaded section 123, the inner peripheral surface of the insert is provided with an axially extending and outwardly tapering surface 125. A short unthreaded cylindrical section 126 is preferably disposed between the threaded section 123 and the tapered surface 125.

The nipple 130, which is adapted to fit into the end of both the hose 92 and the insert 110 and form a sealing engagement with the insert 110, is provided at the end thereof with a generally cylindrical elongated portion 131 extending axially into the hose to about the position of the end of the socket 100 when in assembled position therewith. The cylindrical portion 131 cooperates in radially spaced relation with the irregular inner peripheral surface of the wire braid 94 to restrain the tube 92 against axial movement.

On the outer peripheral surface of the nipple 130 beyond the cylindrical portion 131 is formed a slightly enlarged diameter cylindrical section 134 which cooperates in spaced relation with the ribs 121 and the annular groove 122 of the insert 110 to provide an improved gripping and sealing engagement with the tube 92. An exterior threaded section 135 extends axially from the cylindrical surface 134 and is adapted to threadably engage the threaded section 123 of the insert 110. An annular groove 137 formed at the end of the threaded section 135 cooperates in spaced relation with the cylindrical section 125 of the insert 110 to form an elongated chamber 127 providing adequate clearance between the shoulder of the groove 137 and the threaded section 123 when the insert 110 and the nipple 130 are brought into sealing engagement.

The nipple member 130 has a generally enlarged diameter section 140 formed on the outer peripheral surface thereof axially spaced from the threaded section 135 by the groove 137, and forming a circumferential sealing engagement with the outwardly tapered surface 125 of the insert member 110. The section 140 is preferably formed by first and second tapering frustro-conical portions which intersect along a circumferential line with both frustro-conical portions tapering away from the surface 125 of the insert 110 on the respective sides of the circumferential line of intersection, as in the prior embodiment shown in FIGS. 1–6.

An enlarged end section 145 beyond the tapered section 140 is provided with flats 146 on the outer peripheral surface thereof, which provide an engaging surface for a wrench or other tool adapted to threadably set the nipple 130 in the insert 110. A cylindrical connector section 147 extends axially from the base of the section 145 and may be provided with a conventional swivel nut 148 or other means for connection with another conduit member (not shown).

In assembling the connector of FIG. 7, the socket 100 is positioned over the hose 90 and the insert member 110 is inserted into the end of the hose 90 between the wire braid 94 and the tube 92. The socket 100 is then threadably engaged with the insert 110, thereby tightly locking the wire braid 94 therebetween before the insertion of the nipple member. The nipple member 139 is then inserted into the end of the tube 92 and is threaded into the insert 110, thereby forming a metal-to-metal sealing engagement between the nipple member and the insert, and securing the end of the hose 90 against axial movement, as heretofore described in connection with the assembly of the form of connector shown in FIGS. 1–6. The cylindrical section 134 of the nipple with the groove 122 in the insert forms a chamber 124 in which fluid leaking along the inside of the tube 92 collects, and the pressure of the fluid therein forces the end of the tube 92 away from the threaded section 135, thereby crowding the tube into an area of smaller cross-sectional dimension because of taper of the groove 122, as in the first form of the invention. The gripping of the hose between the cylindrical sections 101 and 131 prevents the tube from being forced out of the radial space between the nipple and the insert so that the tube is held in positive sealing engagement with the insert and nipple.

We claim:

The combination of a hose having a flexible inner tube and a wire reinforcement covering the inner tube, and a fitting comprising a socket member having a generally cylindrical section fitting around the wire reinforcement of the hose, an insert member having an inner end section disposed between the inner tube and the wire reinforcement, and a nipple member having an inner end section inserted into the end of said tube, said members being formed to be releasably attached to each other, said cylindrical section of said socket and said inner end section of said insert member having radially spaced peripheral surfaces receiving the end portion of the wire reinforcement therebetween, said inner end section of said insert member and said inner end section of said nipple member having radially spaced peripheral surfaces providing a sealing chamber therebetween receiving the end portion of said inner tube, said inner periphery of said insert member forming said chamber having tube gripping means formed thereon at an axially spaced location from the end of the inner tube and tapering inwardly axially of the tube from the end thereof, whereby pressure on the end of the tube due to fluid leaking into said chamber tends to force the end portion of the tube into a reduced cross sectional area of the chamber and into sealing engagement with said insert member, and said cylindrical portion of said socket member being crimped and applying a compressive load on the wire reinforcement of the hose to thereby grip the wire reinforcement, said compressive load on the wire reinforcement also forcing said inner end section of said insert member radially inward and increasing the angle of said taper, thereby improving said sealing engagement between the end portion of the inner tube and said insert member.

References Cited in the file of this patent

UNITED STATES PATENTS

| | | |
|---|---|---|
| 2,262,228 | Garretson | Nov. 11, 1941 |
| 2,332,355 | Stecher | Oct. 19, 1943 |
| 2,394,632 | Parker | Feb. 12, 1946 |
| 2,809,056 | Kaiser | Oct. 8, 1957 |
| 2,833,567 | Bacher et al. | May 6, 1958 |
| 2,858,147 | Guarnaschelli | Oct. 28, 1958 |
| 2,877,027 | Bagnell | Mar. 10, 1959 |

FOREIGN PATENTS

| | | |
|---|---|---|
| 1,205,588 | France | Aug. 17, 1959 |
| 737,564 | Great Britain | Sept. 28, 1955 |